United States Patent
Taki (10) Patent No.: US 10,350,517 B2
(45) Date of Patent: Jul. 16, 2019

(54) TUBULAR MESH FILTER

(71) Applicant: ENPLAS CORPORATION, Saitama (JP)

(72) Inventor: Kenjiro Taki, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 156 days.

(21) Appl. No.: 15/513,785

(22) PCT Filed: May 29, 2015

(86) PCT No.: PCT/JP2015/065568
§ 371 (c)(1),
(2) Date: Mar. 23, 2017

(87) PCT Pub. No.: WO2016/047205
PCT Pub. Date: Mar. 31, 2016

(65) Prior Publication Data
US 2018/0229158 A1      Aug. 16, 2018

(30) Foreign Application Priority Data

Sep. 24, 2014   (JP) .................. 2014-193432

(51) Int. Cl.
*B01D 29/11* (2006.01)
*B29C 45/14* (2006.01)
(Continued)

(52) U.S. Cl.
CPC .......... *B01D 29/112* (2013.01); *B01D 29/111* (2013.01); *B01D 29/33* (2013.01);
(Continued)

(58) Field of Classification Search
CPC .... B01D 29/112; B01D 39/16; B01D 35/005; B01D 29/11; B29C 45/2628;
(Continued)

(56) References Cited

U.S. PATENT DOCUMENTS

2012/0181237 A1*   7/2012   Winkler .............. B01D 33/067
                                                                210/437

FOREIGN PATENT DOCUMENTS

| JP | 7-32376 | 2/1995 |
| JP | 2001-70721 | 3/2001 |
| JP | 2013-193035 | 9/2013 |

OTHER PUBLICATIONS

International Search Report dated Aug. 25, 2015 in International (PCT) Application No. PCT/JP2015/065568.

* cited by examiner

*Primary Examiner* — Madeline Gonzalez
(74) *Attorney, Agent, or Firm* — Wenderoth, Lind & Ponack, L.L.P.

(57) ABSTRACT

A tubular mesh filter has a first ring-shaped portion formed in one end side of a tubular filter portion that filters out a foreign object from a fluid and a second ring-shaped portion formed in the other end side of the filter portion. The first and second ring-shaped portions are thicker than the filter portion. The first and second ring-shaped portions and the filter portion are injection-molded in an integral manner by initially injecting molten resin into a first cavity portion used to shape the first ring-shaped portion, flowing the molten resin filled in the first cavity portion evenly to a second cavity portion used to shape the filter portion, and supplying the molten resin filled in the second cavity portion to a third cavity portion used to shape the second ring-shaped portion.

2 Claims, 8 Drawing Sheets

(51) Int. Cl.
  *B01D 35/00* (2006.01)
  *B01D 39/16* (2006.01)
  *B29C 45/26* (2006.01)
  *B29C 45/00* (2006.01)
  *B01D 29/33* (2006.01)
  *B29L 31/14* (2006.01)

(52) U.S. Cl.
  CPC ............ *B01D 35/005* (2013.01); *B01D 39/16* (2013.01); *B01D 39/1692* (2013.01); *B29C 45/0046* (2013.01); *B29C 45/14* (2013.01); *B29C 45/261* (2013.01); *B29C 45/2628* (2013.01); *B01D 2239/10* (2013.01); *B29C 2045/0027* (2013.01); *B29L 2031/14* (2013.01)

(58) Field of Classification Search
  CPC ... B29C 45/261; B29C 45/0046; B29C 45/14; B29C 2045/0027; B29L 2031/14
  USPC ................. 210/499, 498, 497.01, 348, 493.2
  See application file for complete search history.

OUTER SIDE

INNER SIDE

TUBULAR MESH FILTER

TECHNICAL FIELD

The present invention relates to a tubular mesh filter used to filter out a foreign object from a fluid, and more particularly, to a tubular mesh filter formed through injection molding in an integral manner.

BACKGROUND ART

A tubular mesh filter is inserted, for example, in the middle of a fuel feeding pipe connected to a fuel injection unit of a vehicle or an oil pipe of a lubricating unit or the like to filter out a foreign object from a fluid such as fuel or oil.

First Background Art Example

Figure 5A:
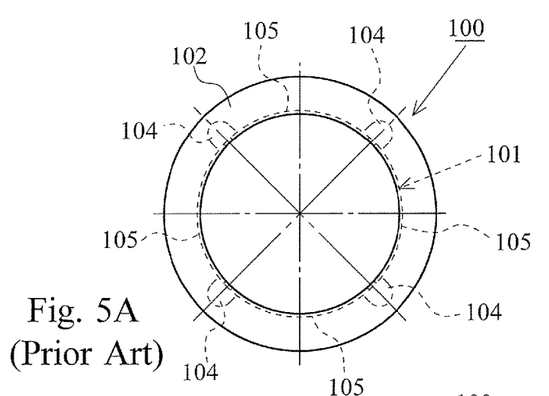
FIG. 5A is a front view illustrating the tubular mesh filter.
Figure 5B:
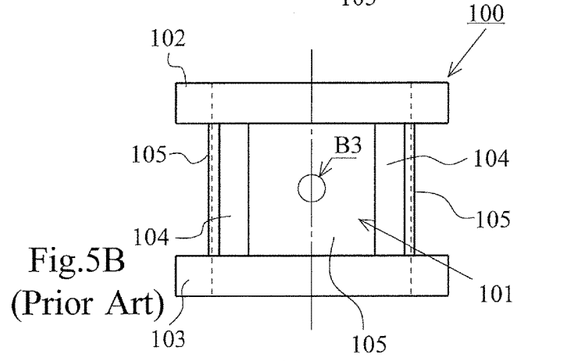
FIG. 5B is a side view illustrating the tubular mesh filter.
Figure 5C:
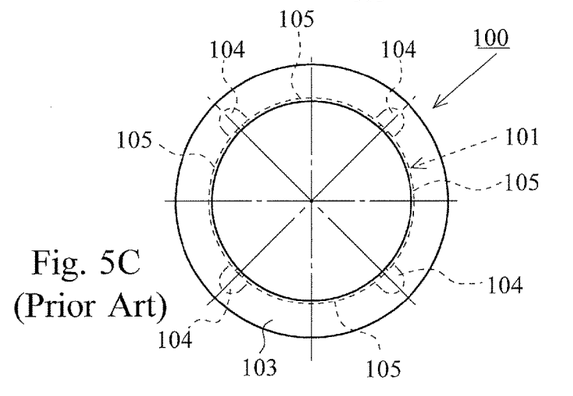
FIG. 5C is a rear view illustrating the tubular mesh filter.
Figure 5D:
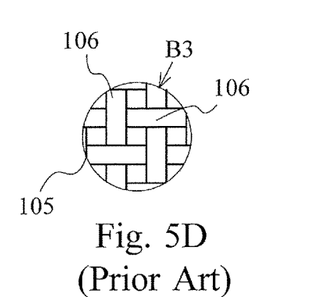
FIG. 5D is an enlarged view illustrating a part B3 of FIG. 5B.
Figure 6A:
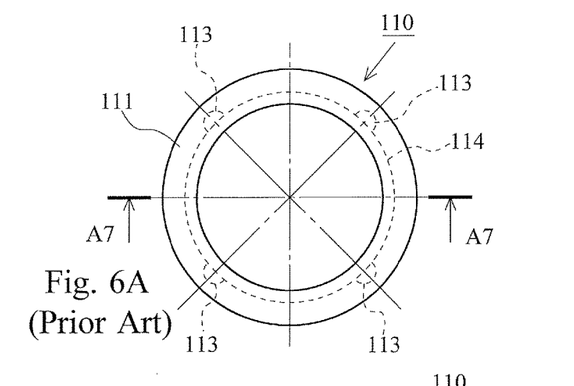
FIG. 6A is a front view illustrating the tubular mesh filter.
Figure 6B:
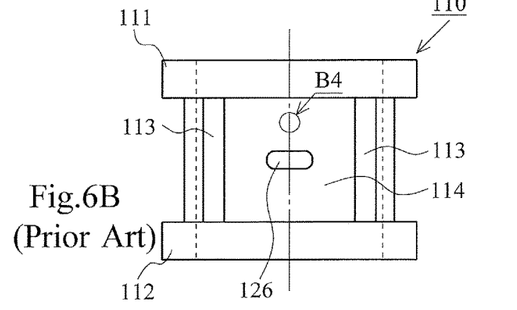
FIG. 6B is a side view illustrating the tubular mesh filter.
Figure 6C:
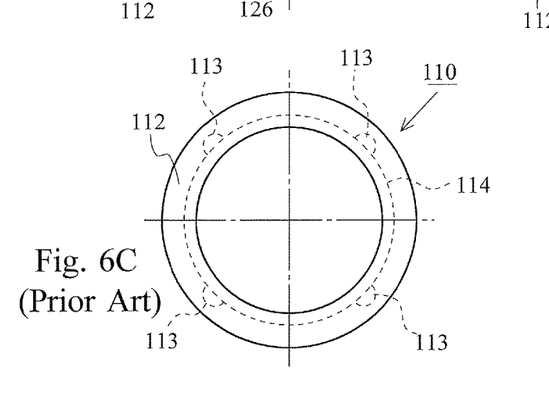
FIG. 6C is a rear view illustrating the tubular mesh filter.
Figure 6D:
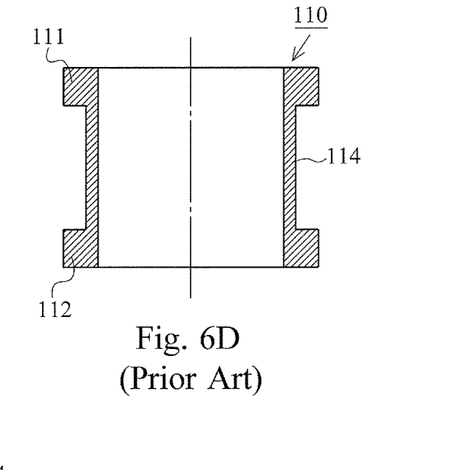
FIG. 6D is a cross-sectional view taken along a line A7-A7 of FIG. 6A to illustrate the tubular mesh filter.

FIGS. 5A to 5D are diagrams illustrating a tubular mesh filter 100 of a first background art example. As illustrated in FIGS. 5A to 5D, the tubular mesh filter 100 of the first background art example includes a tubular filter portion 101, a first ring-shaped portion 102 positioned in one opening end of the tubular filter portion 101, a second ring-shaped portion 103 positioned in the other opening end of the tubular filter portion 101, and a plurality of ribs 104 that connect the first and second ring-shaped portions 102 and 103 along a longitudinal direction of the tubular filter portion 101. In addition, in this tubular mesh filter 100, a synthetic fiber mesh 105 of the tubular filter portion 101 is fixed to the opening between neighboring ribs 104 through insert-molding to shape the tubular filter portion 101. Note that the synthetic fiber mesh 105 is formed by weaving synthetic fibers 106 in a lattice shape as illustrated in FIG. 5D so as to exhibit a filter function for filtering out a foreign object.

However, in the tubular mesh filter 100 of the first background art illustrated in FIG. 5, it is necessary to arrange a plurality of synthetic fiber meshes 105 in a predetermined position inside the mold in the event of insert-molding (as many as the number of the openings between the neighboring ribs 104). This makes a manufacturing process complicated and degrades a product yield.

Second Background Art Example

In this regard, in order to address disadvantages of the first background art example, a tubular mesh filter 110 of the second background art example has been proposed as illustrated in FIGS. 6A to 6D, 7A, and 7B. The tubular mesh filter 110 of the second background art example is formed by injection-molding overall components in an integral manner (including the first and second ring-shaped portions 111 and 112, a plurality of ribs 113, and the filter portion 114). Therefore, a product yield was improved (see JP H7-32376 A).

Figure 8:
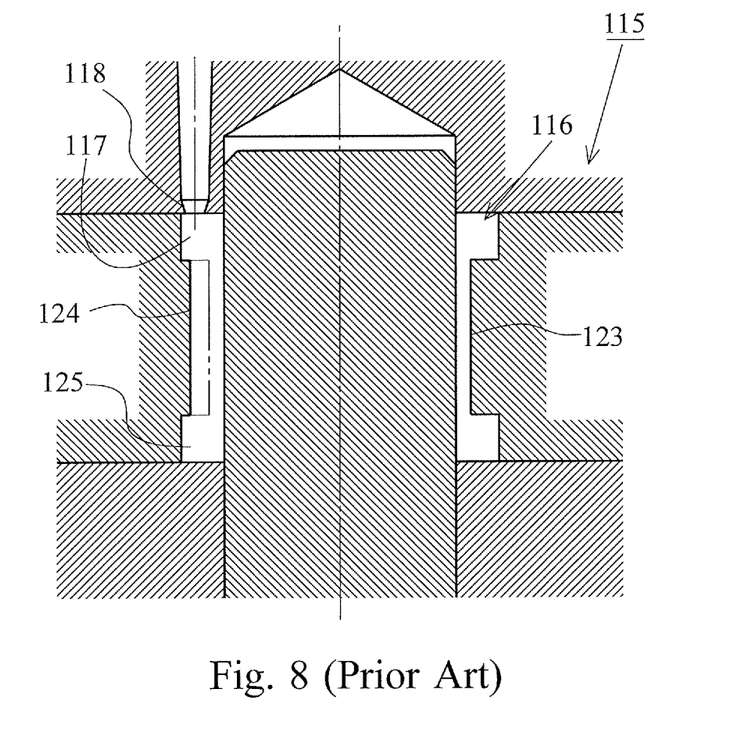
FIG. 8 is a diagram illustrating a mold for injection molding the tubular mesh filter of the second background art.

In the tubular mesh filter 110 of the second background art example, as illustrated in FIG. 8, molten resin is injected from a gate 118 opened to the first cavity portion 117 of the cavity 116 of the mold 115 into the cavity 116 (the cavity portion for forming any one of the first and second ring-shaped portions 111 and 112) to form the shape of the cavity 116.

In the tubular mesh filter 110 of the second background art example, the crosspieces 121 and 122 used to shape the openings 120 of the filter portion 114 have narrow widths w1 and w2 (for example, 0.15 mm). If the openings 120 of the filter portion 114 are small (for example, if the cubic opening 120 has a side length of 0.1 mm), a filling finish portion of the injection molding corresponds to the filter portion 114, so that a molding defect may occur due to a short shot in the filter portion 114. That is, during the injection molding of the tubular mesh filter 110, the molten resin injected into the first cavity portion 117 of the cavity 116 fills the first cavity portion 117. Then, the molten resin does not flow to the second cavity portion 123 used to shape the filter portion 114 having high flow resistance, but flows to the third cavity portion 124 used to shape a plurality of ribs 113 having lower flow resistance. Then, the molten resin flows from the third cavity portion 124 used to shape a plurality of ribs 113 to the fourth cavity portion 125 (the cavity portion used to shape the other one of the first and second ring-shaped portions 111 and 112) to fill the first, third, and fourth cavity portions 117, 124, and 125. Then, the molten resin flows to the second cavity portion 123 used to shape the filter portion 114 having higher flow resistance than other portions 117, 124, and 125. As a result, gas may be trapped in the filling finish portion of the second cavity portion 123 used to shape the filter portion 114 during the injection molding, so that a short shot may occur in the tubular mesh filter 110. Such a short shot in the filter portion 114 may generate a molding defect.

Figure 7A:
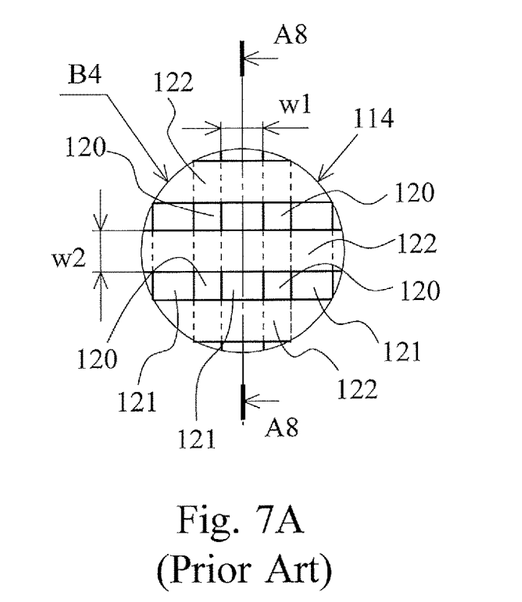
FIG. 7A is an enlarged view illustrating a part B4 of FIG. 6B.
Figure 7B:
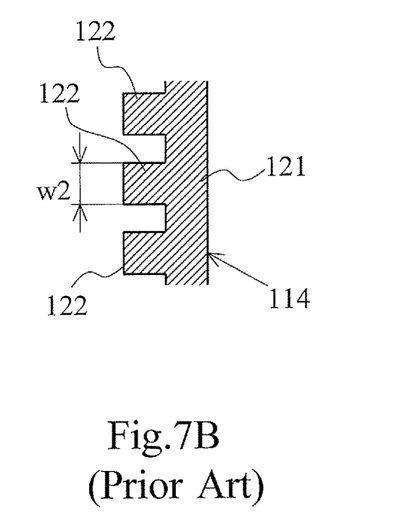
FIG. 7B is a cross-sectional view taken along a line A8-A8 of FIG. 7A.

In this regard, in the tubular mesh filter 110 of the second background art example, in order to prevent a molding defect of the filter portion 114 caused by a short shot, an island-shaped resin reservoir 126 is formed in a part of the filter portion 114 serving as the filling finish portion of the molten resin, so that degassing is performed using this island-shaped resin reservoir 126. This island-shaped resin reservoir 126 is provided in each filter portion 114 between the ribs 113.

However, since the island-shaped resin reservoir 126 is formed in the tubular mesh filter 110 of the second background art, the area of the opening 120 of the filter portion 114 is reduced. Therefore, the open area ratio of the filter portion 114 (a ratio of the total area of the openings 120 against the area of the outer circumferential surface of the tubular filter portion 114) is reduced disadvantageously.

SUMMARY OF THE INVENTION

In view of the aforementioned problems, the present invention provides a tubular mesh filter provided with a filter portion having a high open area ratio.

According to an aspect of the present invention, a tubular mesh filter 1 includes: a tubular filter portion 2 configured to filter out a foreign object from a fluid; a first ring-shaped portion 4 formed along a circumferential direction of the filter portion 2 in one end of a center axis 3 of the filter portion 2; and a second ring-shaped portion 5 formed along the circumferential direction of the filter portion 2 in the other end of the center axis 3 of the filter portion 2. In the tubular mesh filter 1 according to the present invention, at least one of the first ring-shaped portion 4 and the second ring-shaped portion 5 is thicker than the filter portion 2. In addition, the filter portion 2 has an inner circumferential portion 6 and an outer circumferential portion 7. In addition, the inner circumferential portion 6 of the filter portion 2 includes a plurality of vertical crosspieces 8 that extend along the center axis 3 and are arranged at equal intervals around the center axis 3 with an identical shape. Furthermore, the outer circumferential portion 7 of the filter portion 2 includes a plurality of horizontal crosspieces 10 that extend along an outer circumference of the inner circumferential portion 6 and are arranged at equal intervals in the center axis 3 direction with an identical shape, and intersections between the horizontal crosspieces 10 and the vertical crosspieces 8 are formed integrally with the vertical crosspieces 8. Openings 11 that allow passing of the fluid are formed in a part of the filter portion 2 other than the intersections between the horizontal crosspieces 10 and the vertical crosspieces 8.

Moreover, the first ring-shaped portion 4, the second ring-shaped portion 5, and the filter portion 2 are injection-molded in an integral manner by initially injecting molten resin to a first cavity portion 20 of a mold 12 used to shape one of the first ring-shaped portion 4 and the second ring-shaped portion 5 thicker than the filter portion 2, evenly flowing the molten resin filled in the first cavity portion 20 to a second cavity portion 21 of the mold 12 used to shape the filter portion 2, and supplying the molten resin filled in the second cavity portion 21 to a third cavity portion 22 of the mold 12 used to shape the other one of the first second ring-shaped portion 4 and the second ring-shaped portion 5. Thus, the first ring-shaped portion 4, the second ring-shaped portion 5, and the filter portion 2 are integrally-formed of resin material to have a one-piece (monolithic) construction.

Using the tubular mesh filter according to the present invention, the filling finish portion of the injection molding corresponds to any one of the first and second ring-shaped portions, and the filter portion does not serve as the filling finish portion of the injection molding. Therefore, it is not necessary to provide a degassing resin reservoir in the filter portion. Accordingly, compared to the tubular mesh filter having the degassing resin reservoir in the filter portion, it is possible to increase an open area ratio of the filter portion.

BRIEF DESCRIPTION OF DRAWINGS

FIGS. 1A to 1D are diagrams illustrating a tubular mesh filter according to an embodiment of the invention, in which

FIGS. 3A and 3B are diagrams illustrating a mold used in injection molding of the tubular mesh filter according to the present invention, in which

FIGS. 5A to 5D are diagrams illustrating a tubular mesh filter of the first background art, in which

FIGS. 6A to 6D are diagrams illustrating a tubular mesh filter of the second background art, in which

DETAILED DESCRIPTION OF EMBODIMENTS

Embodiments of the present invention will now be described with reference to the accompanying drawings.

Figure 1A:
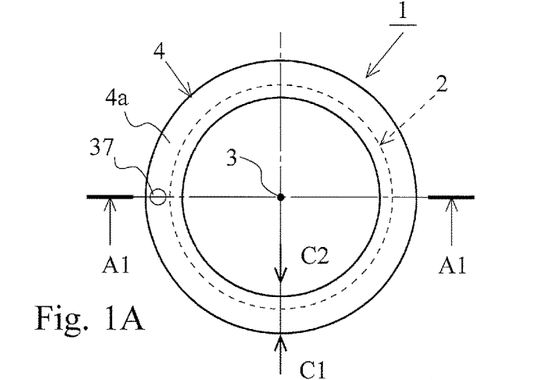
FIG. 1A is a front view illustrating the tubular mesh filter.
Figure 1B:
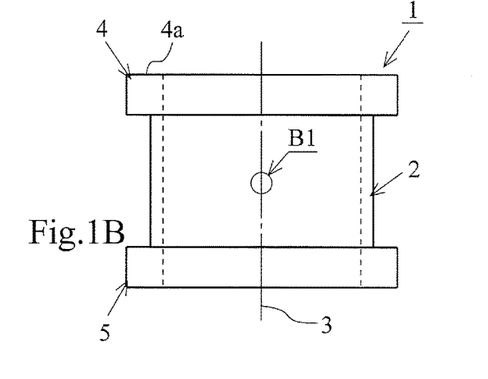
FIG. 1B is a side view illustrating the tubular mesh filter.
Figure 1C:
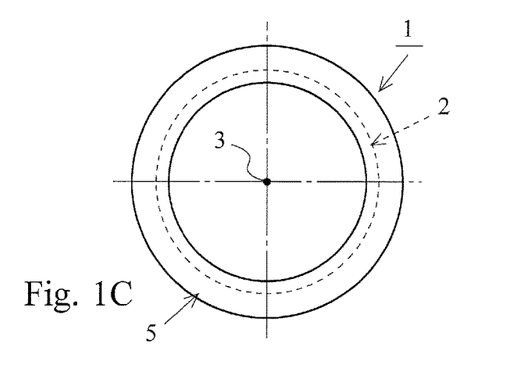
FIG. 1C is a rear view illustrating the tubular mesh filter.
Figure 1D:
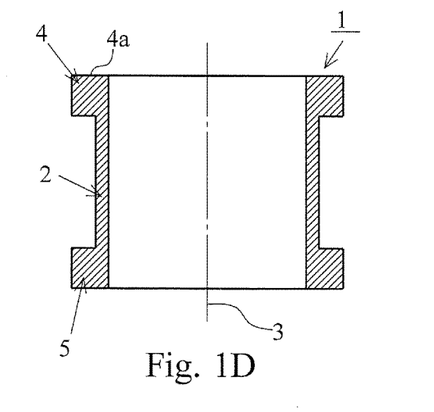
FIG. 1D is a cross-sectional view taken along a line A1-A1 of FIG. 1A to illustrate the tubular mesh filter.
Figure 2A:
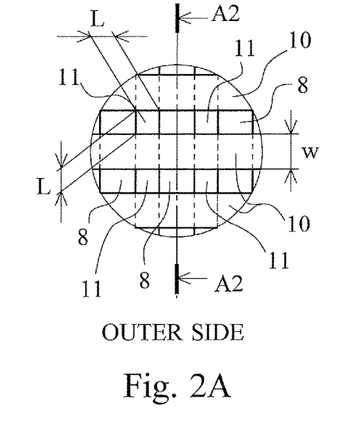
FIG. 2A is an enlarged view illustrating a part B1 of FIG. 1B (a partial enlarged view illustrating the tubular mesh filter as seen in a direction C1 of FIG. 1A to illustrate a part of the outer side of the tubular mesh filter.
Figure 2B:
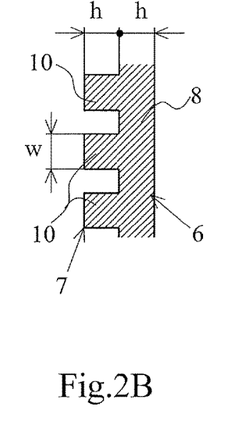
FIG. 2B is a cross-sectional view taken along a line A2-A2 of FIG. 2A (a partial enlarged cross-sectional view illustrating the tubular mesh filter)
Figure 2C:
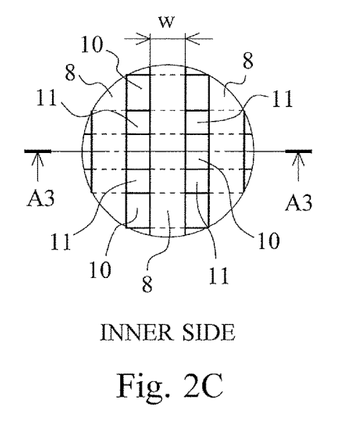
FIG. 2C is a partial enlarged view illustrating the tubular mesh filter as seen in a direction C2 of FIG. 1A (a partial enlarged view illustrating the inner side of the tubular mesh filter)
Figure 2D:
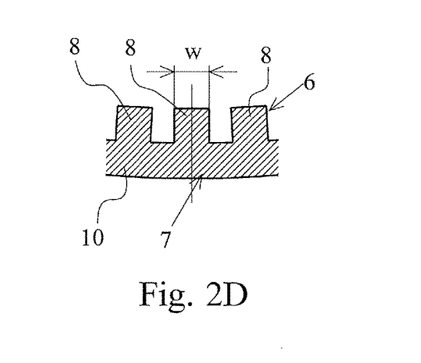
FIG. 2D is a cross-sectional view taken along a line A3-A3 of FIG. 2C (a partial enlarged cross-sectional view illustrating the tubular mesh filter)

FIGS. 1A to 1D and 2A to 2D are diagrams illustrating a tubular mesh filter 1 according to an embodiment of the invention. FIG. 1A is a front view illustrating the tubular mesh filter 1. FIG. 1B is a side view illustrating the tubular mesh filter 1. FIG. 1C is a rear view illustrating the tubular mesh filter 1. FIG. 1D is a cross-sectional view taken along a line A1-A1 of FIG. 1A to illustrate the tubular mesh filter 1. In addition, FIG. 2A is an enlarged view illustrating a part B1 of FIG. 1B (by partially enlarging an outer side of the tubular mesh filter 1 to illustrate the tubular mesh filter 1 as seen in a direction C1 of FIG. 1A). FIG. 2B is a cross-sectional view taken along a line A2-A2 of FIG. 2A (a partial enlarged cross-sectional view illustrating the tubular mesh filter 1). FIG. 2C is a partial enlarged view illustrating the tubular mesh filter 1 as seen in a direction C2 of FIG. 1A (a partial enlarged view illustrating an inner side of the tubular mesh filter 1). FIG. 2D is a cross-sectional view taken along a line A3-A3 of FIG. 2C (a partial enlarged cross-sectional view illustrating the tubular mesh filter 1).

As illustrated in FIGS. 1A to 1D and 2A to 2D, the tubular mesh filter 1 includes a tubular filter portion 2 for filtering out a foreign object from a fluid, a first ring-shaped portion 4 formed in one end along a center axis 3 of the filter portion 2, and a second ring-shaped portion 5 formed in the other end along the center axis 3 of the filter portion 2. This tubular mesh filter 1 is entirely formed of resin (such as polyacetal (POM) or nylon 66) in an integral manner (i.e., to have a one-piece monolithic construction).

The first and second ring-shaped portions 4 and 5 are annular members formed along an opening edge of the filter portion 2. The first and second ring-shaped portions 4 and 5 protrude radially outward of the filter portion 2 like a flange and are thicker than the filter portion 2.

The filter portion 2 has an inner circumferential portion 6 located radially inward and an outer circumferential portion 7 formed integrally in an outer circumferential side of the inner circumferential portion 6. The inner circumferential portion 6 of the filter portion 2 includes a plurality of vertical crosspieces 8 extending along the center axis 3 and arranged at equal intervals around the center axis 3 with an identical shape, so that the first and second ring-shaped portions 4 and 5 are connected along the center axis 3. The outer circumferential portion 7 of the filter portion 2 includes a plurality of horizontal crosspieces 10 that extend along the outer circumference of the inner circumferential portion 6 and are arranged at the equal interval in the center axis 3 direction with an identical shape. Intersections between the horizontal and vertical crosspieces 10 and 8 are formed integrally with the vertical crosspieces 8. In addition, remaining parts of the filter portion 2 other than the intersections between the vertical crosspiece 8 and the horizontal crosspiece 10 serve as openings 11 that allow passing of a fluid. Note that, according to this embodiment, the vertical crosspiece 8 and the horizontal crosspiece 10 have a width w of 0.15 mm and a height h of 0.15 mm. In addition, the openings 11 have a rectangular shape having a side length L of 0.1 mm.

Figure 3A:
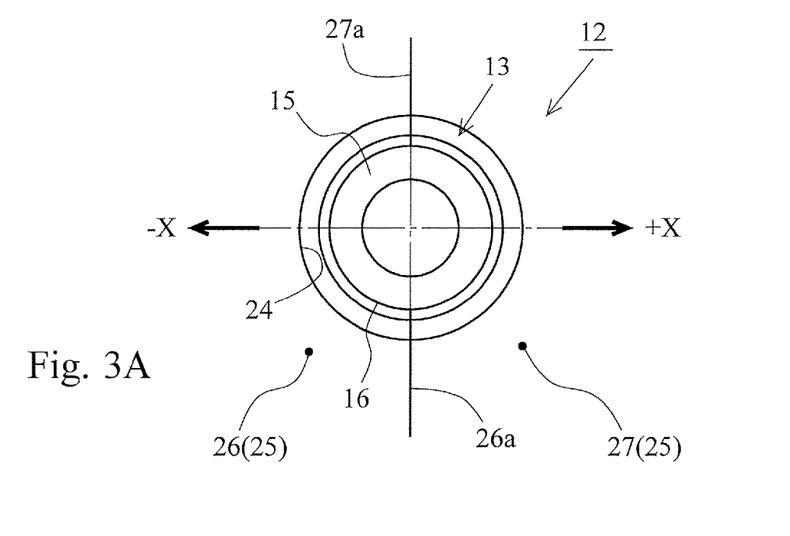
FIG. 3A is a partial plan view illustrating the mold (a partial cross-sectional plan view taken along a line A4-A4 of FIG. 3B to illustrate the mold)
Figure 3B:
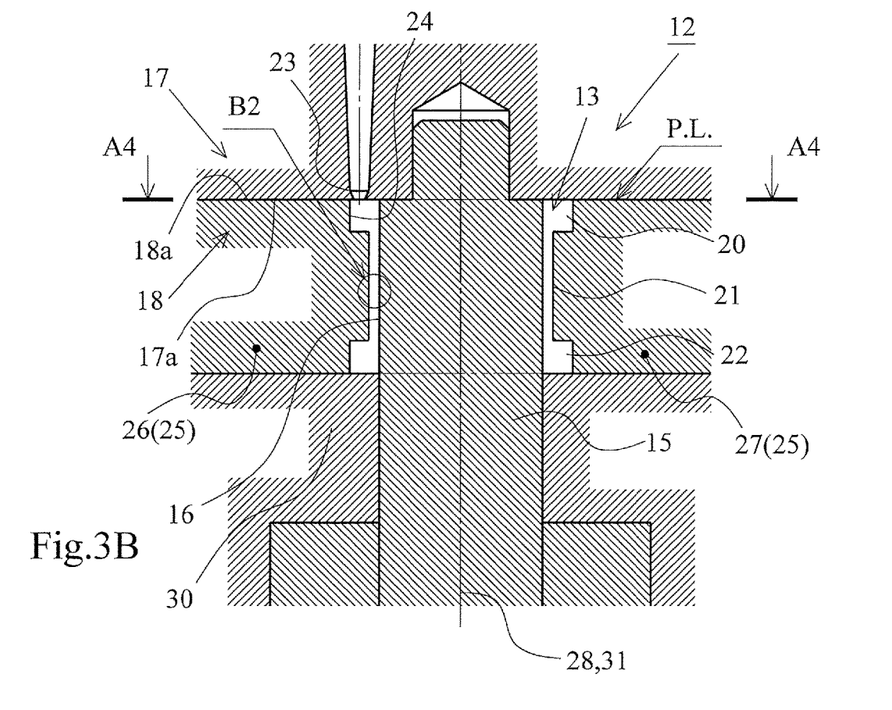
FIG. 3B is a cross-sectional view schematically illustrating a mold structure.
Figure 4A:
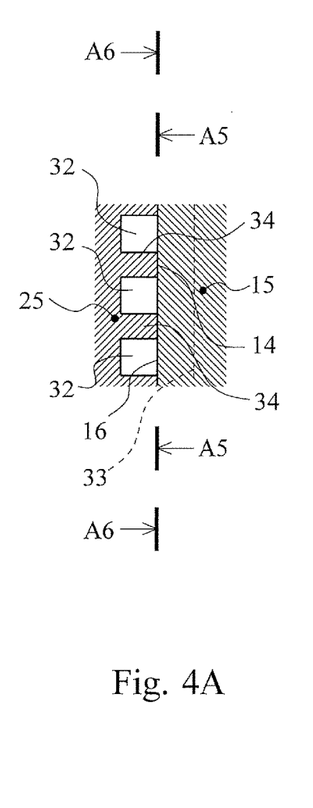
FIG. 4A is a partial cross-sectional view illustrating a cavity (an enlarged view illustrating the part B2 of FIG. 3B)
Figure 4B:
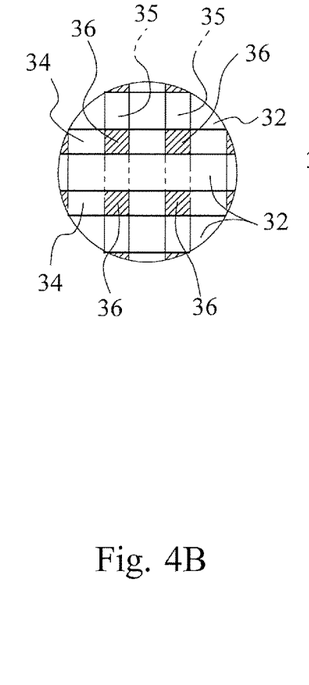
FIG. 4B is a partial enlarged cross-sectional view taken along a line A5-A5 of FIG. 4A to illustrate an inner surface of the cavity.
Figure 4C:
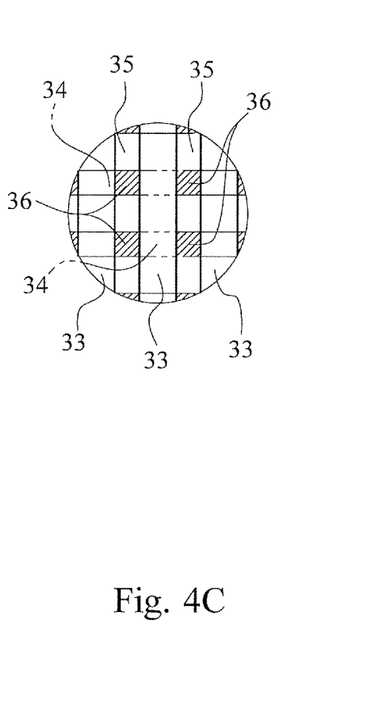
FIG. 4C is a partial cross-sectional enlarged view taken along a line A6-A6 of FIG. 4A to illustrate a part of an outer circumferential surface of a center pin.

FIGS. 3A, 3B, and 4A to 4C are diagrams illustrating a mold 12 used to perform injection molding of the tubular mesh filter 1 according to this embodiment. Note that FIG. 3A is a partial plan view illustrating the mold 12 (a partial cross-sectional plan view taken along a line A4-A4 of FIG. 3B to illustrate the mold 12), and FIG. 3B is a cross-sectional view schematically illustrating a structure of the mold 12. In addition, FIG. 4A is a partial cross-sectional view illustrating a cavity 13 (an enlarged view illustrating the part B2 of FIG. 3B). FIG. 4B is a partial cross-sectional enlarged view taken along a line A5-A5 of FIG. 4A to illustrate an inner surface 14 of the cavity 13. FIG. 4C is a partial enlarged cross-sectional view taken along the line A6-A6 of FIG. 4A to illustrate an outer circumferential surface 16 of the center pin 15.

As illustrated in FIGS. 3A and 3B, the mold 12 includes a first mold 17 and a second mold 18, and a cavity 13 for injection-molding the tubular mesh filter 1 is formed on joint surfaces 17a and 18a of the first and second molds 17 and 18. The cavity 13 includes an annular first cavity portion 20 for shaping the first ring-shaped portion 4, a tubular second cavity portion 21 for shaping the tubular filter portion 2, and an annular third cavity portion 22 for shaping the second ring-shaped portion 5.

The first mold 17 has a gate 23 opened to the first cavity portion 20. In addition, the second mold 18 has a separable slidable template 25 provided with a cavity hole 24 for forming a profile of the outer circumference of the cavity 13 on the joint surface 18a with the first mold 17. In this separable slidable template 25, a center pin 15 is inserted into the center of the cavity hole 24 to form the cavity 13 between the outer circumferential surface 16 of the center pin 15 and the inner surface of the cavity hole 24. In addition, this separable slidable template 25 includes a first slidable template 26 and a second slidable template 27 formed to bisect the cavity hole 24, so that the first and second slidable templates 26 and 27 can be separated from each other and slide oppositely (+X and −X directions in FIG. 3A) from a state that the separation surfaces 26a and 27a confront each other (the state of FIG. 3A). In addition, the second mold 18 has an ejection plate 30 that blocks one end side of the cavity 13 along the center axis 28 and supports the separable slidable template 25. This ejection plate 30 slides along the center axis 31 of the center pin 15 after separation of the separable slidable template 25, so that the tubular mesh filter 1 subjected to the injection molding and fitted to the center pin 15 can be separated (released) from the center pin 15.

As illustrated in FIGS. 4A and 4B, on the inner surface 14 of the cavity 13 for shaping the second cavity portion 21 of the separable slidable template 25, a plurality of circumferential trenches 32 for shaping the horizontal crosspieces 10 of the filter portion 2 of the tubular mesh filter 1 are formed at equal intervals along the center axis 28 of the cavity 13. In addition, as illustrated in FIGS. 4A and 4C, on the outer circumferential surface 16 of the center pin 15 fitted to the cavity hole 24 of the separable slidable template 25, a plurality of axial trenches 33 for shaping the vertical crosspieces 8 of the filter portion 2 of the tubular mesh filter 1 are formed at equal intervals along the circumferential direction. In addition, in the process of injection molding, a circumferential protrusion 34 between the circumferential trenches 32 formed in the cavity hole 24 of the separable slidable template 25 abuts on an axial protrusion 35 between the axial trenches 33 formed on the outer circumferential surface 16 of the center pin 15. Therefore, the openings 11 of the filter portion 2 are shaped while molten resin flowing in the second cavity portion 21 is not supplied to the abutting portion 36 between the circumferential protrusion 34 of the separable slidable template 25 and the axial protrusion 35 of the center pin 15 (as indicated by hatching in FIGS. 4B and 4C).

In the mold 12 configured as described above, if the molten resin is injected from the gate 23 to the first cavity portion 20 of the cavity 13 while the first and second slidable templates 26 and 27 confront each other, and the first and second molds 17 and 18 are combined with each other (mold clamping) as illustrated in FIGS. 3A and 3B, the molten resin does not directly flow to the second cavity portion 21 having flow resistance higher than that of the first cavity portion 20, and the molten resin filled in the first cavity portion 20 is evenly supplied to the second cavity portion 21. Then, the molten resin filled in the second cavity portion 21 is supplied to the third cavity portion 22. Therefore, in the mold 12 for injection-molding the tubular mesh filter 1 according to this embodiment, the third cavity portion 22 used to shape the second ring-shaped portion 5 corresponds to a filling finish portion, and the filter portion 2 is not the filling finish portion. Therefore, it is not necessary to provide a resin reservoir for degassing in the second cavity portion 21 used to shape the filter portion 2. As a result, the tubular mesh filter 1 according to this embodiment injection-molded using the mold 12 of FIGS. 3A, 3B, and 4A to 4C does not have the degassing resin reservoir at least in the filter portion 2. Therefore, it is possible to increase the number of openings 11 of the filter portion 2 compared to the tubular mesh filter 110 of the second background art. Accordingly, it is possible to increase an open area ratio of the filter portion 2.

In the mold 12 illustrated in FIGS. 3A, 3B, and 4A to 4C, the molten resin in the cavity 13 is cooled and hardened to form the tubular mesh filter 1. Then, as the first and second molds 17 and 18 are separated, the first and second slidable templates 26 and 27 of the separable slidable template 25 are separated in synchronization with the separation of the first and second molds 17 and 18, so that the tubular mesh filter 1 remains to be fitted to the center pin 15. Then, the tubular mesh filter 1 fitted to the center pin 15 is pressed by the ejection plate 30 that slides along the center pin 15 to recede from the center pin 15, so that tubular mesh filter 1 is released from the mold 12. Note that, when the first and second molds 17 and 18 are separated, the gate 23 is separated from the edge surface 4a of the first ring-shaped portion 4 of the tubular mesh filter 1, so that a gate separation trace 37 remains on the end surface 4a of the first ring-shaped portion 4 of the tubular mesh filter 1.

As described above, in the tubular mesh filter 1 according to this embodiment, the filling finish portion of the injection molding corresponds to the second ring-shaped portion 5, and the filter portion 2 does not serve as the filling finish portion, in the process of injection molding. Therefore, it is not necessary to provide a degassing resin reservoir at least in the filter portion 2. Accordingly, it is possible to increase the number of openings 11 in the filter portion 2 and increase the open area ratio of the filter portion 2, compared to the tubular mesh filter provided with the degassing resin reservoir in the filter portion 2. In addition, the tubular mesh filter 1 according to this embodiment is not provided with the degassing resin reservoir 126 and a plurality of ribs 113, compared to the tubular mesh filter 110 of the second background art. Accordingly, it is possible to increase the number of openings 11 in the filter portion 2 and increase the open area ratio of the filter portion.

Note that the first and second ring-shaped portions 4 and 5 of the tubular mesh filter 1 according to this embodiment have the identical shape. Therefore, the gate 23 may also be opened in the cavity portion used to shape the second ring-shaped portion 5.

Although the first and second ring-shaped portions 4 and 5 of the tubular mesh filter 1 according to this embodiment are thicker than the filter portion 2, the present invention is not limited thereto. Instead, at least one of the first and second ring-shaped portions 4 and 5 may be thicker than the filter portion 2. In addition, the gate 23 may be opened to the cavity portion used to shape the one of the first and second ring-shaped portions 4 and 5 thicker than the filter portion 2.

Although the width w and the height h of the vertical and horizontal crosspieces 8 and 10 and the dimension of the opening 11 of the tubular mesh filter 1 according to this embodiment have been described by way of example, the present invention is not limited thereto. They may be set depending on required filter performance.

Although both ends in an axial direction of the tubular mesh filter 1 according to this embodiment are opened, the present invention is not limited thereto. Alternatively, a lid may be formed in one end side of the axial direction, and a new filter portion may also be formed in one end side of the axial direction.

Although the vertical and horizontal crosspieces 8 and 10 of the tubular mesh filter 1 according to this embodiment have a square cross-sectional shape by way of example, the present invention is not limited thereto. The vertical and horizontal crosspieces 8 and 10 may have a rectangular shape having different width w and height h.

Although the opening 11 of the tubular mesh filter 1 according to this embodiment has a square shape by way of example, the present invention is not limited thereto. The opening 11 may have a rectangular shape.

Although only a single pin-point gate 23 for opening the first cavity portion 20 is provided in the mold 12 for injection molding of the tubular mesh filter 1 according to this embodiment, the present invention is not limited thereto. Two or more pin-point gates 23 may also be provided. In addition, without limiting to the pin-point gate 23, any type of gates such as a ring gate or a side gate may also be employed.

REFERENCE SIGNS AND NUMERALS 1 tubular mesh filter,
2 filter portion,
3 center axis,
4 first ring-shaped portion,
5 second ring-shaped portion,
6 inner circumferential portion,
7 outer circumferential portion,
8 vertical crosspiece,
10 horizontal crosspiece,
11 opening,
12 mold,
20 first cavity portion,
21 second cavity portion,
22 third cavity portion

The invention claimed is:
1. A tubular mesh filter comprising:
a tubular filter portion configured to filter out a foreign object from a fluid;
a first ring-shaped portion formed along a circumferential direction of the filter portion at a first end of a center axis of the filter portion; and
a second ring-shaped portion formed along the circumferential direction of the filter portion at a second end of the center axis of the filter portion,
wherein at least one of the first and second ring-shaped portions is thicker than the filter portion,
wherein the filter portion has an inner circumferential portion and an outer circumferential portion,
wherein the inner circumferential portion of the filter portion includes a plurality of vertical crosspieces that extend along the center axis and are arranged at equal intervals around the center axis with an identical shape,
wherein the outer circumferential portion of the filter portion includes a plurality of horizontal crosspieces that extend along an outer circumference of the inner circumferential portion and are arranged at equal intervals in the center axis direction with an identical shape, and intersections between the horizontal crosspieces and the vertical crosspieces are integral with the vertical crosspieces,
wherein openings that allow passing of the fluid are in a part of the filter portion other than the intersections between the horizontal crosspieces and the vertical crosspieces, and
wherein the first ring-shaped portion, the second ring-shaped portion, and the filter portion are all integrated together of a resin material to have a one-piece monolithic construction.
2. The tubular mesh filter according to claim 1, wherein the first ring-shaped portion has a gate separation trace therein.

* * * * *